Sept. 2, 1947.  J. REMESCH ET AL  2,426,642
CHILD'S VEHICLE
Filed May 11, 1944   3 Sheets-Sheet 1
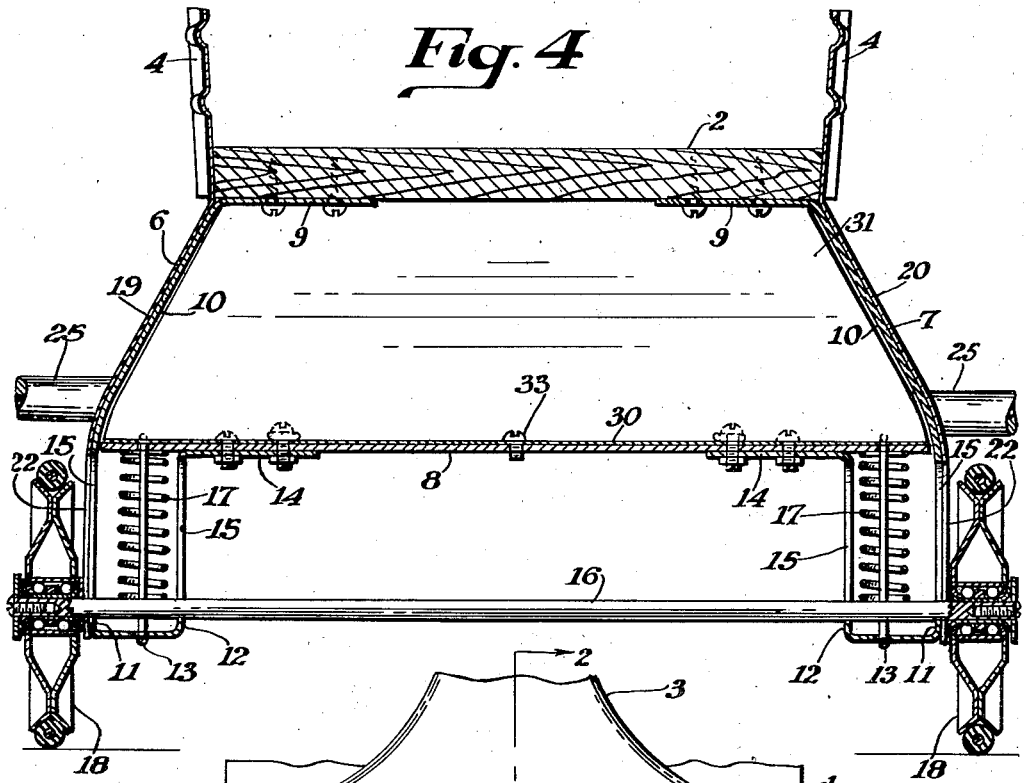
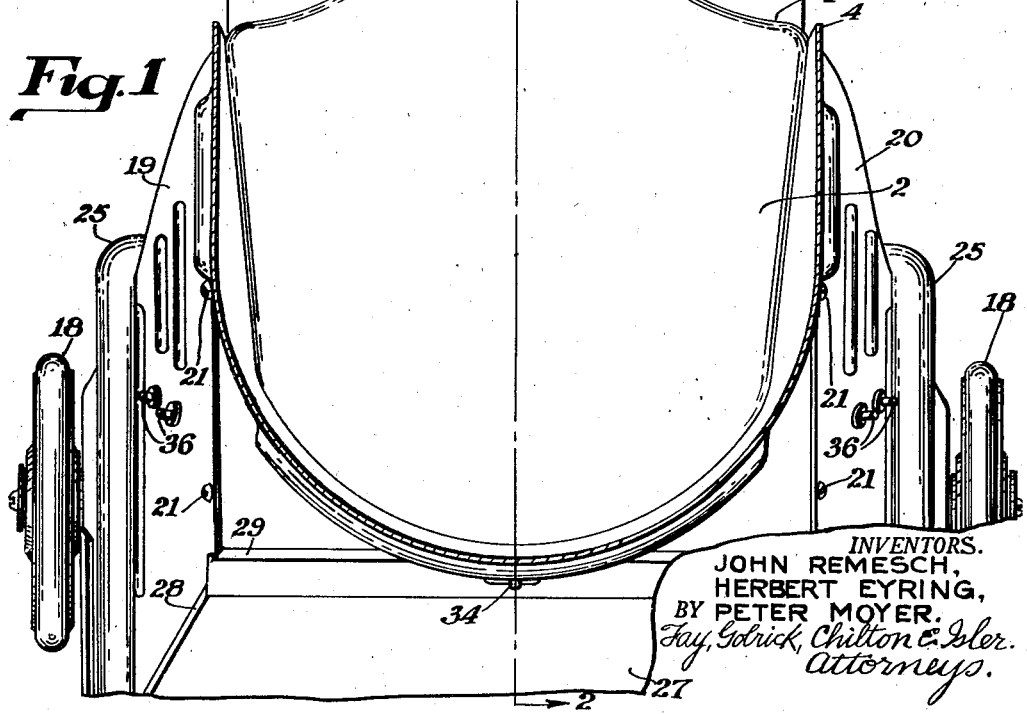
INVENTORS.
JOHN REMESCH,
HERBERT EYRING,
BY PETER MOYER.
Fay, Gobrick, Chilton & Isler.
Attorneys.

Sept. 2, 1947. J. REMESCH ET AL 2,426,642
CHILD'S VEHICLE
Filed May 11, 1944 3 Sheets-Sheet 2

INVENTORS.
JOHN REMESCH,
HERBERT EYRING,
PETER MOYER.
BY Fay, Gobrick, Chilton & Isler.
Attorneys.

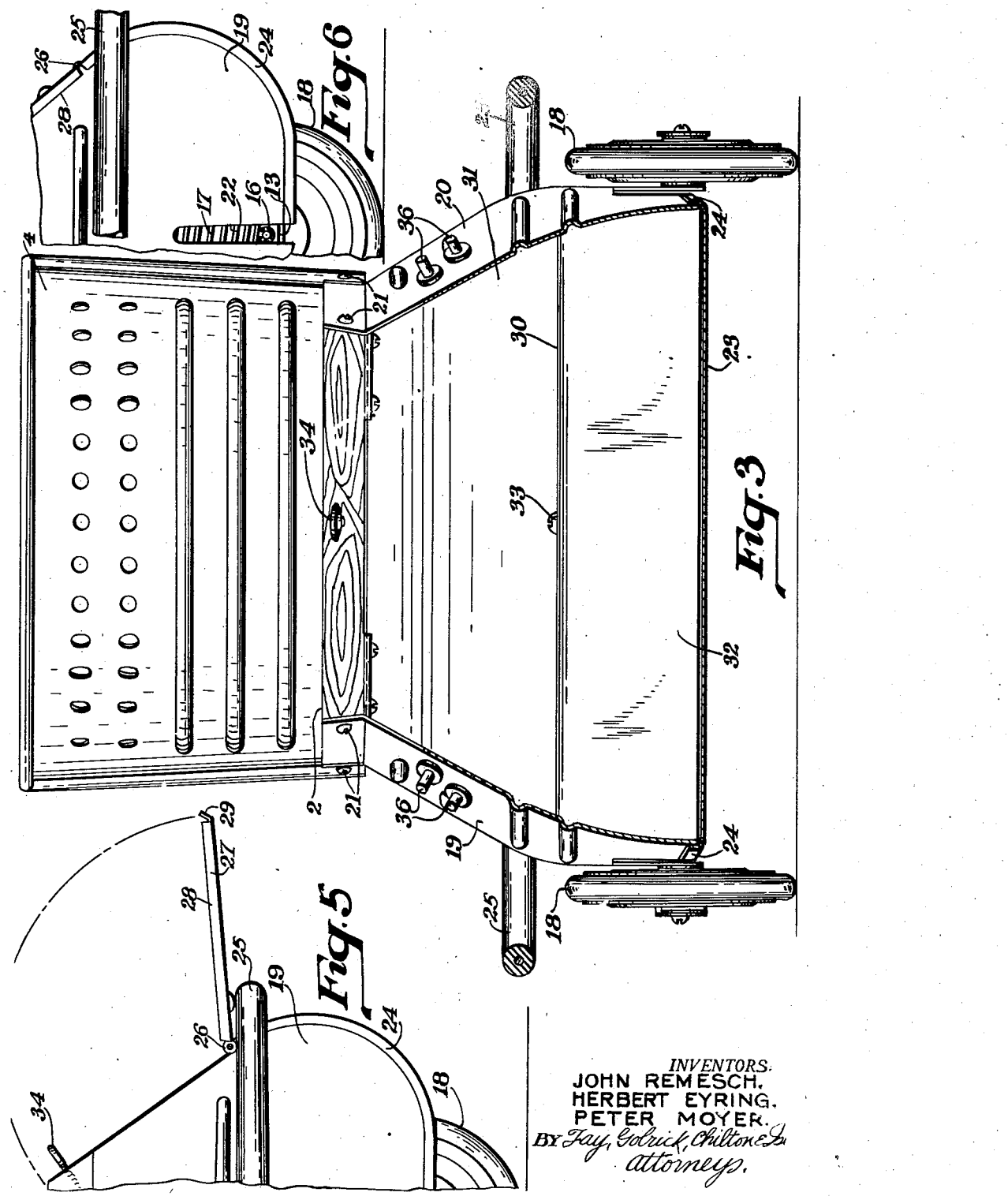

Patented Sept. 2, 1947

2,426,642

UNITED STATES PATENT OFFICE 2,426,642

CHILD'S VEHICLE

John Remesch, Cleveland, Herbert Eyring, North Olmstead, and Peter Moyer, Cleveland, Ohio, assignors, by mesne assignments, to Shuler Co., Cleveland, Ohio, a partnership consisting of Stanley Shuler, Myron Shuler, Harry Shuler, and Morris Shuler Application May 11, 1944, Serial No. 535,184

4 Claims. (Cl. 296—37)

1

This invention relates, as indicated, to a child's vehicle, but has reference more particularly to a child's vehicle of the straddle-board or baby walker type, having foot-boards for supporting the feet of the occupant when the vehicle is being used as a push or pull cart for the child.

The primary object of the invention is the provision in a vehicle of the character described of a novel and commodious trunk or receptacle, wherein baby bottles, diapers, packages and other articles may be carried so as to greatly increase the utility and convenience of such a vehicle.

Another object of the invention is the provision in a vehicle of the character described of a trunk or receptacle consisting of a minimum number of easily manufactured and readily assembled parts, and which are so assembled and attached to the vehicle as to blend into the vehicle design as a whole, while creating an illusion that the vehicle is devoid of any appearance which would suggest the existence of such a trunk or receptacle in association therewith.

A further object of the invention is the provision in a vehicle of the character described of a trunk or receptacle, which is so designed that access thereto may be had under all conditions of use of the vehicle, that is, whether the vehicle is used as a walker or as push or pull cart.

Other objects and advantages of the invention will be apparent during the course of the following description.

In the accompanying drawings, forming a part of this specification, and in which like numerals are employed to designate like parts throughout the same, Fig. 1 is a fragmentary top plan view and section of the rear portion of a child's vehicle embodying the novel features of the invention, the section being taken on the line 1—1 of Fig. 2;

Fig. 3 is a cross-sectional view, taken on the line 3—3 of Fig. 2;

Fig. 4 is a fragmentary cross-sectional view, taken on the line 4—4 of Fig. 2;

Fig. 5 is a fragmentary side-elevational view, showing the door of the trunk or receptacle in fully open position;

Fig. 6 is a view similar to Fig. 5, but showing the recesses in the sides of the trunk for accommodating vertical movements of the vehicle rear axle.

2

Figure 2:
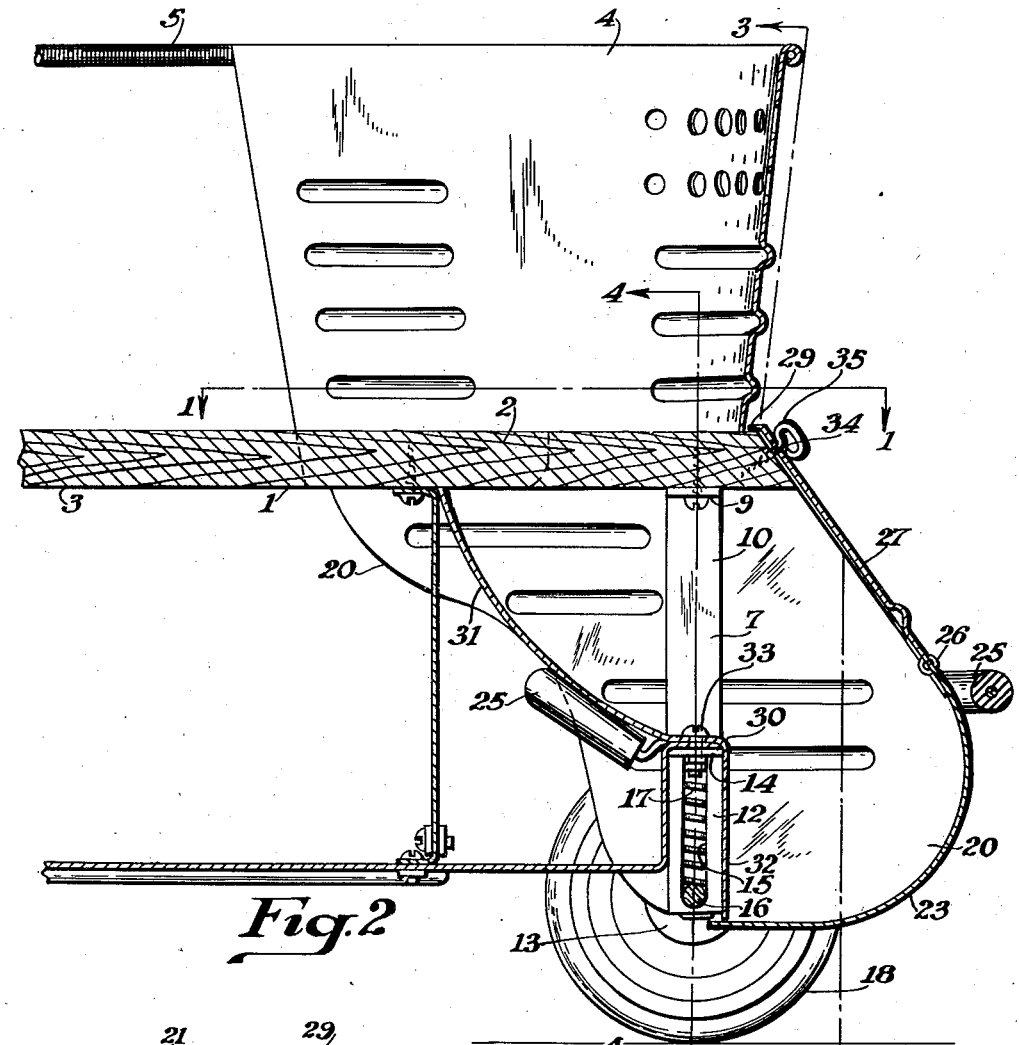
Fig. 2 is a fragmentary cross-sectional view, taken on the line 2—2 of Fig. 1.

Referring more particularly to the drawings, the vehicle will be seen to comprise a saddle board 1, the rear portion of which provides a seat 2 from which projects a narrow or reduced portion 3 to provide a space on each side thereof to accommodate the legs of a child.

Secured to and partially encircling the seat 2 of the board 1 is a back rest 4, to which is secured a retaining ring 5, which, together with the back rest, serves to prevent the child from falling or moving from the seat.

The saddle board 1 is supported at the rear by means of a bolster consisting of three elements 6, 7 and 8, made of strap metal. The elements 6 and 7 are identical and each is formed to provide a horizontal portion 9, which extends transversely of and is screwed to the bottom of the seat 2, a portion 10 which extends downwardly and outwardly from the seat, and a U-shaped portion consisting of vertical spaced arms 11 and 12 and a cross-member 13, the arm 12 having a horizontally and inwardly extending flange 14 at its upper end. The element 8 extends between the arms 11 and is secured to the flange 14, as clearly shown in Fig. 4.

The arms 11 and 12 are provided with elongated openings or slots 15, and through these slots extend the ends of an axle 16, the axle being normally urged toward the bottoms of these slots by means of coil springs 17, which act to cushion the upward movement of the axle, the springs being interposed between the axle and the ends of the element 8 of the bolster. Mounted upon the ends of the axle 16 are the rear wheels 18 of the vehicle.

The construction thus described is more or less conventional for vehicles of this type, the present invention being concerned more particularly with the provision and construction of a trunk or receptacle for the vehicle, within which baby bottles, diapers, packages and other articles may be carried, and whereby the utility and convenience of the vehicle is considerably improved.

The trunk or receptacle consists of a number of sheet-metal parts or stampings which are so assembled and attached to the vehicle as to blend into the vehicle design as a whole and at the same time create an illusion that the vehicle is devoid of any appearance which would suggest the existence of such a trunk or receptacle in association therewith.

For these purposes, the trunk or receptacle comprises sides 19 and 20, which are secured, as by screws 21, to the sides of the seat 2 of the vehicle and extend downwardly, rearwardly and outwardly with respect to such seat sides, the lower portions of the sides 19 and 20 being disposed at the inboard sides of and closely adjacent the wheels 18. The sides 19 and 20, moreover, are provided with vertically-extending slots or recesses 22 in their lower edges, through which the ends of the axle extend, the recesses 22 serving to accommodate the vertical movements of such axle.

The trunk further includes a curved bottom 23, the edges of which are provided with flanges 24 which are spot welded to the rear edges of the sides 19 and 20. The bottom 23 extends forwardly to the rear edge of the recesses 22, and upwardly to a point just above the level of the rubber bumper 25 with which vehicles of this type are usually provided.

Hinged, as at 26, to the upper edge of the bottom 23 is a back or cover 27 which is of such shape and size as to close the space formed by the upper edge of the bottom 23, the rear edge of the seat 2, and the rear edges of the sides 19 and 20. The cover 27, moreover, is provided with side flanges 28 which, when the cover 27 is closed, overlie the rear edges of the sides 19 and 20, and is further provided at its upper edge with a flange 29, which overlies the rear flat surface of the seat 2 when the cover is closed.

The receptacle further includes a sheet-metal member 30, which forms a front wall for the receptacle, and comprises a curved portion 31, the lower edge of which overlies the element 8 of the bolster, and a vertical portion 32 disposed rearwardly of the bolster and extending downwardly into engagement with the bottom 23 of the receptacle. The member 30 may be retained in place by means of screws 33.

Figure 7:
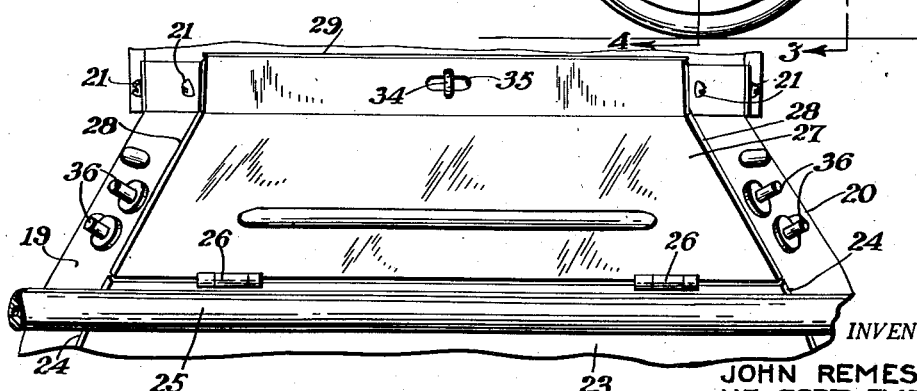
Fig. 7 is a fragmentary rear elevational view of the vehicle, with the door or cover of the trunk in closed position.

When in the closed position shown in Figs. 2 and 7, the door may be retained in such position by means of a screw fastener 34, which is secured to the rear edge of the seat 2 and may be turned to permit passage of the flat head thereof through a slot 35 in the cover 27, the head being then turned to the position shown in Figs. 2 and 7 to thereby lock the door of the trunk in closed position.

The sides 19 and 20 are further provided with pins 36 for the attachment thereto of the usual removable handle whereby the vehicle is pulled or pushed when used as a push or pull cart. These pins are so located that when the handle (not shown) is attached thereto, the handle extends upwardly and rearwardly at such an angle as not to interfere with access to the cover 27 for the purpose of opening or closing the trunk. Moreover, since the rubber bumper 25 is disposed below the level of the hinges 26, the presence of such bumper will not interfere with the opening of the cover 27, as will be apparent from Fig. 5 of the drawings.

The trunk or receptacle, as thus provided, is of ample size for carrying diapers, baby clothes, and small packages, thereby increasing the utility and convenience of the vehicle. The utility of the trunk, moreover, is enhanced by virtue of the fact that access to the trunk may be easily had under all conditions of usage of the vehicle.

It is to be understood that the form of my invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a vehicle of the character described, a saddle board having a seat portion at the rear thereof; a bolster beneath said seat portion for supporting said seat portion, and an axle supported by said bolster, and a trunk disposed largely beneath said seat portion, said trunk comprising spaced sides which are attached at their upper edges to the side edges of said seat portion and extend to said axle, a bottom secured to said sides, a closure for the rear of said trunk, and a front wall for said trunk, said wall extending from said seat portion to a point rearwardly of said bolster.

2. A vehicle, as defined in claim 1, in which said front wall is secured to said bolster.

3. A vehicle, as defined in claim 1, in which said front wall has a curved upper portion and a vertical portion disposed rearwardly of said bolster and extending to a point adjacent the forward edge of said bottom.

4. A vehicle, as defined in claim 1, in which the spaced sides extend on the outside of the bolster, thereby concealing the same.

JOHN REMESCH.
HERBERT EYRING.
PETER MOYER.

REFERENCES CITED

The following references are of record in the file of this patent:

UNITED STATES PATENTS

| Number | Name | Date |
|---|---|---|
| 120,645 | Holt | Nov. 7, 1871 |
| 1,356,034 | Black | Oct. 19, 1920 |
| 1,652,004 | Fischer | Dec. 6, 1927 |
| 563,526 | Whitney | July 7, 1896 |
| 86,856 | Monroe | Feb. 9, 1869 |

FOREIGN PATENTS

| Number | Country | Date |
|---|---|---|
| 276,840 | Great Britain | Sept. 8, 1927 |
| 5,514 | Great Britain (1913) | Feb. 26, 1914 |

OTHER REFERENCES

"Taylor Juvenile Products," catalog of The Frank F. Taylor Co., Norwood, Cincinnati, Ohio, Published Dec. 22, 1926, pages 12 and 13.